United States Patent
Sawall et al.

(10) Patent No.: US 11,812,753 B2
(45) Date of Patent: Nov. 14, 2023

(54) SOLVENT COMPOSITIONS PROMOTING PLANT GROWTH

(71) Applicant: WinField Solutions, LLC, Arden Hills, MN (US)

(72) Inventors: Dustyn Sawall, New Richmond, WI (US); Shelby Stark, Woodbury, MN (US); Lee Boles, River Falls, WI (US); Cliff Watrin, Wyoming, MN (US)

(73) Assignee: WINFIELD SOLUTIONS, LLC, Arden Hills, MN (US)

( * ) Notice: Subject to any disclaimer, the term of this patent is extended or adjusted under 35 U.S.C. 154(b) by 241 days.

(21) Appl. No.: 16/936,192

(22) Filed: Jul. 22, 2020

(65) Prior Publication Data

US 2022/0022464 A1   Jan. 27, 2022

(51) Int. Cl.
*A01N 65/00*   (2009.01)
*A01N 25/02*   (2006.01)

(52) U.S. Cl.
CPC ............. *A01N 65/00* (2013.01); *A01N 25/02* (2013.01)

(58) Field of Classification Search
CPC ........ A01N 65/00; A01N 25/02; A01N 43/12; A01N 43/38; A01N 43/90; A01N 45/00
See application file for complete search history.

(56) References Cited

U.S. PATENT DOCUMENTS

| 5,059,241 A | 10/1991 | Young |
| 6,884,754 B1 | 4/2005 | Schlatter et al. |
| 10,104,883 B2 | 10/2018 | Stoller et al. |
| 10,499,560 B1 | 12/2019 | Bissell et al. |
| 2003/0013612 A1 | 1/2003 | Asrar et al. |
| 2004/0077498 A1 | 4/2004 | Lynch |
| 2004/0214881 A1 | 10/2004 | Taoka et al. |
| 2006/0172890 A1 | 8/2006 | Datta et al. |

(Continued)

FOREIGN PATENT DOCUMENTS

| CN | 87106830 | * | 6/1988 | ........... C07D 265/28 |
| CN | 105104380 A | | 12/2015 | |
| CN | 104938489 B | | 5/2017 | |

OTHER PUBLICATIONS

Machine Translation of CN 87106830, 1988, pp. 1-24. (Year: 1988).*

(Continued)

*Primary Examiner* — Trevor Love
(74) *Attorney, Agent, or Firm* — PADDA LAW GROUP

(57) ABSTRACT

Plant growth compositions include a solvent composition and an active component composition. The solvent composition includes 1-methoxy-2-propanol, glyceryl triacetate, methyl isobutyl ketone, 2-bytoxy ethanol, ethyl acetate, butyl lactate, lactic acid and/or n-butyl pyrrolidone. The active component combination is formulated to increase the growth of a plant, and includes an auxin, a gibberellin, a cytokinin, or a combination thereof. The solvent composition excludes butanol and/or citric acid. The boiling point of the solvent composition is at least about 100° C. and less than about 180° C. The solvent composition is compatible with *Rhizobia*. A method of improving plant growth involves applying the plant growth composition to plant seeds, which may include soybean seeds, corn seeds, wheat seeds, barley seeds, alfalfa seeds, or combinations thereof, and growing the nascent plants to maturity.

10 Claims, 1 Drawing Sheet

*100*

102 — Applying a growth composition to plant seeds, wherein the growth composition includes an active component combination of auxin, gibberellin and cytokinin, along with a solvent composition comprising 1-methoxy-2-propanol, glyceryl triacetate, methyl isobutyl ketone, 2-bytoxy ethanol, ethyl acetate, butyl lactate, lactic acid and/or n-butyl pyrrolidone 104 — Growing the plant seeds into mature plants.

(56) References Cited

U.S. PATENT DOCUMENTS

| | | |
|---|---|---|
| 2006/0247130 A1 | 11/2006 | Van et al. |
| 2009/0061484 A1 | 3/2009 | Scott et al. |
| 2010/0170314 A1 | 7/2010 | Goodwin |
| 2010/0216641 A1 | 8/2010 | Huang et al. |
| 2010/0233146 A1 | 9/2010 | Mcdaniel |
| 2010/0267557 A1 | 10/2010 | Silverman et al. |
| 2011/0028324 A1 | 2/2011 | Cordingley et al. |
| 2011/0294666 A1 | 12/2011 | Cordingley et al. |
| 2012/0108431 A1 | 5/2012 | Williams et al. |
| 2013/0184429 A1 | 7/2013 | Pugh et al. |
| 2013/0203596 A1 | 8/2013 | Lovatt |
| 2013/0225410 A1 | 8/2013 | Haas et al. |
| 2014/0220641 A1 | 8/2014 | Tian et al. |
| 2014/0378308 A1 | 12/2014 | Perry et al. |
| 2015/0011392 A1 | 1/2015 | Haas et al. |
| 2015/0090252 A1 | 4/2015 | Barbeau et al. |
| 2015/0257383 A1 | 9/2015 | Deisenroth et al. |
| 2015/0313225 A1 | 11/2015 | Lohmann et al. |
| 2015/0344445 A1 | 12/2015 | Lohmann et al. |
| 2016/0021885 A1 | 1/2016 | Lovatt |
| 2016/0060183 A1 | 3/2016 | Ghosh et al. |
| 2016/0198714 A1 | 7/2016 | Stoller et al. |
| 2016/0278384 A1 | 9/2016 | Jabs et al. |
| 2016/0312178 A1 | 10/2016 | Sims et al. |
| 2017/0071212 A1 | 3/2017 | Sabin |
| 2017/0181435 A1 | 6/2017 | Nave et al. |
| 2017/0188584 A1 | 7/2017 | Jabs et al. |
| 2018/0007897 A1 | 1/2018 | Roux et al. |
| 2018/0027811 A1 | 2/2018 | Sawant et al. |
| 2018/0184647 A1 | 7/2018 | Bissell et al. |
| 2019/0037836 A1 | 2/2019 | Bissell et al. |
| 2019/0124932 A1 | 5/2019 | Hammerschmidt et al. |
| 2019/0142000 A1 | 5/2019 | Sheth et al. |
| 2019/0261627 A1 | 8/2019 | Round et al. |
| 2019/0316140 A1 | 10/2019 | South et al. |
| 2020/0100506 A1 | 4/2020 | Wozniak |

OTHER PUBLICATIONS

PCT Application No. PCT/US2021/041924 Invitation to Pay Additional Fees with Partial Search Report and Provisional Opinion, dated Oct. 20, 2021 (24 pages).

* cited by examiner

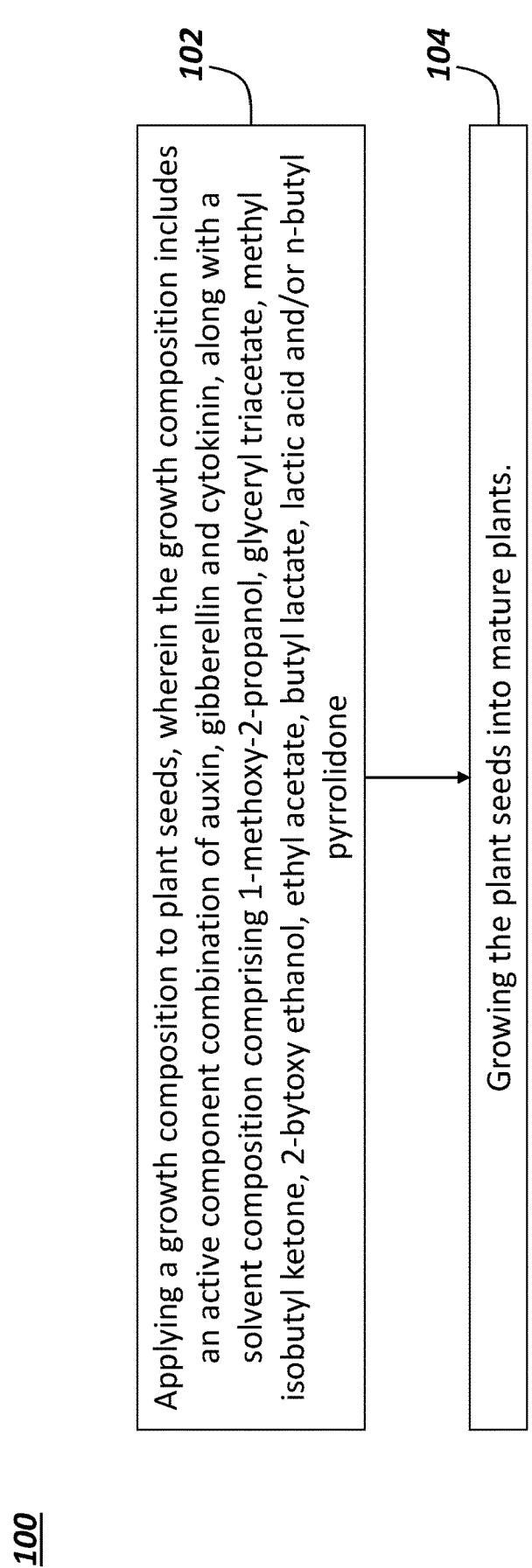

SOLVENT COMPOSITIONS PROMOTING PLANT GROWTH

TECHNICAL FIELD

Implementations relate to inert compositions formulated to improve the solubility and stability of plant growth regulator compositions typically applied to seeds and nascent plants. Particular implementations include inert solvent compositions having improved chemical properties and enhanced compatibility with bacterial species beneficial to plant development.

BACKGROUND

Improving plant growth and development is a major focus of the agricultural industry. One approach to achieving robust growth involves applying growth stimulants to seeds and young plants. These substances may include plant growth regulators ("PGRs"), which can comprise combinations of plant hormones that promote cellular growth processes like mitosis, and other substances including, for example, biostimulants, biologicals and plant extracts. These PGRs can be applied to seeds before planting, in-furrow during or after planting, or as foliar sprays applied to the plants as they grow. To facilitate these application methods, PGRs are often dissolved in a liquid carrier, which typically comprises an aqueous solvent. Preexisting liquid carriers suffer many drawbacks, however, which reduce the lifespan and effectiveness of the active PGR components. For example, certain PGR active components have low solubility in current solvents, and many solvents even chemically degrade the active components they are formulated to deliver. Alternative, non-aqueous based solvents may also hinder the effectiveness of seed-applied compositions by reducing seed handling properties.

SUMMARY

In accordance with embodiments of the present disclosure, a plant growth composition may include a solvent composition and an active component combination. The solvent composition may include 1-methoxy-2-propanol, glyceryl triacetate, methyl isobutyl ketone, 2-bytoxy ethanol, ethyl acetate, butyl lactate, lactic acid and/or n-butyl pyrrolidone. The active component combination may be formulated to increase the growth of a plant.

In some examples, the active component combination can include an amount of auxin, an amount of gibberellin, an amount of cytokinin, or a combination thereof. In some embodiments, the solvent composition can exclude butanol. In some examples, the solvent composition can exclude citric acid. In some embodiments, the solvent composition can exclude lactic acid. In some examples, the solvent composition can exclude propylene glycol. In some embodiments, the solvent composition can exclude biodegradable polymers, polyhydric alcohols, or both. In some embodiments, the solvent composition can constitute between about 95 wt % and about 99 wt % of the plant growth composition. In some examples, the solvent composition can be compatible with a plant growth-promoting microbe, such as *Rhizobia*. In some embodiments, the active component combination can be completely soluble within the solvent composition. In some examples, the active component combination may not degrade within the solvent composition for at least about 2 weeks at about 54° C. In some embodiments, the boiling point of the solvent composition can be at least about 100° C. and less than about 180° C. In some examples, the plant growth composition can be configured for direct application to plant seeds.

In accordance with embodiments of the present disclosure, a method of improving plant growth can involve applying a growth composition to plant seeds and growing the plant seeds into mature plants. The growth composition can include a solvent composition and an active component combination. The solvent composition can include 1-methoxy-2-propanol, glyceryl triacetate, methyl isobutyl ketone, 2-bytoxy ethanol, ethyl acetate, butyl lactate, lactic acid and/or n-butyl pyrrolidone.

In some examples, the plants include soybean plants, corn plants, wheat plants, barley plants, alfalfa plants, or combinations thereof. In some embodiments, the active component combination can include an amount of auxin, an amount of gibberellin, an amount of cytokinin, or a combination thereof. In some examples, the solvent composition can exclude butanol, citric acid, lactic acid and propylene glycol. In some embodiments, the boiling point of the solvent composition can be at least about 100° C. and less than about 180° C. In some examples, the solvent composition can be compatible with *Rhizobia*.

BRIEF DESCRIPTION OF THE DRAWINGS

FIG. 1 is a flow diagram of a method performed in accordance with principles of the present disclosure.

DETAILED DESCRIPTION

The solvent compositions provided herein can promote plant growth and development by improving the solubility and stability of various PGR compositions, and may be optimized for direct seed application. The solvent compositions may also protect bacteria capable of naturally enhancing plant growth, such as *Rhizobia*, in sharp contrast to preexisting solvent compositions that are often harmful to such bacterial species. Embodiments of the inert solvent compositions disclosed herein can include, for example, 1-methoxy-2-propanol, glyceryl triacetate, methyl isobutyl ketone, 2-bytoxy ethanol, ethyl acetate, butyl lactate, lactic acid, n-butyl pyrrolidone, butanol, or combinations thereof. The disclosed compositions have been identified and modified for promoting growth by experimentally assessing the impact of various solvent combinations on an assortment of PGR compositions and concentrations. Such assessments revealed that the disclosed compositions may be more compatible with the PGR active components, such that the active components do not degrade, thereby prolonging shelf life and maximizing field effects.

Implementations of the disclosed solvent compositions configured for seed-applied application deviate from preexisting compositions by reducing or replacing propylene glycol and/or water. The present inventors recognized that water solutions may be chemically unstable, which accelerates decomposition of a range of PGR components. The inventors also recognized that despite its popularity, propylene glycol has a high boiling point, which prevents it from drying rapidly. Slow drying ultimately causes the formation of a tacky coating that impedes efficient seed handling. Sticky or tacky coatings caused by glycol-based solvent compositions may cause handling problems at all steps of the processing stream, i.e., at the seed coating stage, the packaging stage, during storage and during planting. Improved handling characteristics made possible by the fast curing rates of the disclosed compositions may increase the maximum loading factor of various PGR active components, thereby lowering the minimum effective usage rate.

The disclosed solvent compositions may be mixed with one or more additional components, and may be advantageously compatible with such products, which may include one or more herbicides, insecticides, fungicides, beneficial bacteria, or combinations thereof. Additives and/or dyes may also be included.

The inventive solvent compositions disclosed herein may be chemically inert, meaning the compositions do not drive growth of the plant seeds to which they are applied, but rather facilitate effective application, stability and solubility of the active components that do drive plant growth.

Solvent Compositions

The compositions provided according to the present disclosure include various amounts of inert compounds, which may include but are not limited to 1-methoxy-2-propanol, glyceryl triacetate, methyl isobutyl ketone, 2-bytoxy ethanol, ethyl acetate, butyl lactate, lactic acid, n-butyl pyrrolidone and/or butanol. Example compositions may include 1-methoxy-2-propanol, ethylene glycol butyl ether, diethylene glycol butyl ether, lactic acid, tetrahydrofuryl alcohol, and/or butyl lactate, and/or variations of one or more of these compounds.

The concentration of the aforementioned solvent components may vary within a given solvent composition. For example, embodiments may also include mixtures of one or more of the aforementioned solvents with various amounts of deionized water, for example up to about 25 wt % or 50 wt % deionized water, such that solvent compositions can include at least about 75 wt % or 50 wt % pure solvent, respectively. Embodiments may also lack water entirely, rendering such embodiments non-aqueous. In various embodiments, a solvent composition may include about 50 wt %, about 55 wt %, about 60 wt %, about 65 wt %, about 70 wt %, about 75 wt %, about 80 wt %, about 85 wt %, about 90 wt %, about 95 wt %, about 96 wt %, about 97 wt %, about 98 wt %, about 99 wt %, or about 100 wt % of one or more the pure solvents disclosed in the preceding paragraph.

Embodiments of the solvent compositions containing less than about 100 wt % of the disclosed solvent components may include an amount of water, as mentioned. Embodiments may also include an amount of one more known solvents, for example propylene glycol or polypropylene glycol. According to such embodiments, a disclosed solvent composition may be combined with a preexisting solvent composition to form a solvent mixture. The solvent mixture may be applied to seeds before planting.

Embodiments of the disclosed solvent compositions may specifically exclude one or more components, some or all of which may be typically incorporated into preexisting solvent compositions. For example, embodiments may specifically exclude butanol. In addition or alternatively, embodiments may exclude citric acid, lactic acid, propylene glycol and/or polypropylene glycol. Embodiments may also lack biodegradable polymers, such as a citrate polymer. Embodiments may also be non-polymerized entirely, such that the seed coatings comprised of the disclosed solvent compositions may be free of polymer-based substances. Example compositions may also be free of C2 to C6 polyhydric alcohols, such as glycerol. The inclusion of one or more of these components may reduce or drastically diminish the advantageous physical and chemical properties of the solvent compositions disclosed herein, such that their exclusion from one or more embodiments is critical for effectively promoting plant growth.

The solvent compositions disclosed herein may also include additional inactive components in the form of adjuvants, excipients and/or surfactants, which may be formulated to improve the effectiveness of the active components with which the solvent compositions are mixed by acting as compatible diluents and/or carrier substances. One or more anti-oxidant(s), such as butylated hydroxytoluene, and/or preservatives may also be included. According to such embodiments, the disclosed solvents may constitute the majority of the total solvent composition, ranging in embodiments from about 85 to about 99.9 wt %, about 90 to about 99.8 wt %, about 95 to about 99.8 wt %, about 98 to about 99.8 wt %, about 99 to about 99.7 wt %, about 99.5 to about 99.8 wt %, or about 99.6 to about 99.7 wt % by weight of the solvent composition. In some implementations, the solvent composition may be free of other solvents not disclosed herein.

The solvent compositions may have a lower boiling point than preexisting solvent compositions. For example, the boiling point of the solvent compositions may range from at least about 100° C. up to about 180° C. Example boiling points may be about 100° C. or less, or about 110° C., 120° C., 130° C., 140° C., 150° C., 160° C., 170° C. or about 180° C. The disclosed boiling points may shorten the curing time of the solvent compositions after seed application relative to preexisting solvent compositions, such that the seeds dry faster and are easier to handle. The curing rate and chemical makeup of the solvent compositions may also produce smooth, dry coatings, such that the coated seeds are not tacky or sticky after drying.

The solvent compositions described herein may be compatible with various growth-stimulating compositions (collectively referred to as "PGR compositions" herein), meaning the solvent compositions do not interfere with or negatively impact the PGR compositions. The PGR compositions may be formulated for one or more plant types, including but not limited to soybeans, corn (maize), wheat, barley, alfalfa, and other crops. Corn plants may include *Zea mays* hybrids, inbreds, haploids, subspecies and varieties. In some examples, one or more of the aforementioned plant types may be excluded from the embodiments disclosed herein.

The PGR compositions dissolved within the disclosed solvent compositions are configured to stimulate plant growth to a greater extent than can be achieved under natural growth conditions. Enhanced growth may be achieved by applying one or more of the disclosed PGR compositions to plant seeds prior to planting. By enhancing the stability and solubility of the PGR compositions, the disclosed solvent compositions can maximize the plant-promoting effects of the PGR compositions. For example, the disclosed solvent compositions may remain chemically and physically stable for at least two weeks after mixing with a PGR composition. Fast curing and smooth application of the solvent compositions can also ensure that the seeds are entirely or substantially coated with a growth composition comprised of at least one PGR composition dissolved in a solvent composition. The PGR compositions disclosed herein can include an active component combination that includes at least one auxin (e.g., indole-3-butyric acid (IBA)), at least one gibberellin (e.g., G4, G7 or both), and/or at least one cytokinin (e.g., kinetin).

Auxin plant hormones are produced mainly in and around growing regions on plant shoots. Auxins typically move from the shoots and roots in the phloem, and more slowly by cell-to-cell polar transport. Example effects elicited by auxins include apical dominance, tropisms, shoot elongation and root initiation. Natural deficiencies of zinc and/or phosphorus may inhibit auxin production in plants. Gibberellin plant hormones are also produced in root tips, and can be found in seeds, young stems and leaves. Gibberellins move from roots to shoots in the xylem and from leaves to shoots by cell-to-cell transport, promoting plant germination and cell elongation. Gibberellin production in plant roots and gibberellin movement to plant shoots can be inhibited by flooding. Cytokinin plant hormones are produced primarily in root tips. Seeds, young stems and leaves also may contain high levels of cytokinins, which are transported through the xylem from the roots to the shoots of a plant. Cytokinins promote cell division in shoot tissue, delay leaf senescence, and promote nodule development. Flooding, drought and high temperatures can inhibit cytokinin production and transport. Accordingly, the PGR components disclosed herein supplement these natural plant hormones and may drive specific physiological processes and may be inhibited by specific environmental phenomena.

Methods of Formulation

Methods of formulating the solvent compositions disclosed herein can involve conducting one or more mixture experiments. In some examples, a mixture experiment can be designed to systematically evaluate the stability and/or solubility of various PGR compositions in differently formulated solvent compositions. The active component load of a given PGR composition may be adjusted from one experiment to the next. For example, the concentration of auxin, gibberellin and/or cytokinin present within a solvent composition may be increased by 2×, 3×, 4× or 5×. Increasing the active component load may advantageously reduce the volume of PGR composition required to achieve improved plant growth.

Embodiments may involve mixing a PGR composition with a solvent composition and determining the solubility and/or stability of the PGR composition within the solvent composition. Solubility and/or stability may be determined visually or with the aid of an analytical device, such as a high performance liquid chromatography column. After mixing the solvent composition with a PGR composition, embodiments may further involve applying the resulting composition to plant seeds, which may then be germinated and grown to maturity. The growth effects attributed to a given solvent composition may be identified by also growing seeds coated with the same PGR composition but a different solvent composition.

Embodiments may also involve performing a root scan of the plants grown from seeds coated with one of the disclosed solvent compositions. Root scanning may be performed using a WinRHIZO™ root scanner, which is configured to measure root density, architecture, surface area, length, diameter, area, volume, topology and/or color caused by a particular PGR composition. A root scan can involve removing the roots from the bottom of each plant stem. The roots from each plant can be scanned simultaneously according to some root scanning protocols.

The solvent composition most compatible with one or more PGR compositions can be identified. In some embodiments, compatibility may be measured by degree of PGR solubility within a solvent composition and/or the length of time at which a PGR composition remains stable (i.e., does not degrade) within a solvent composition. In addition or alternatively, a solvent composition having the lowest boiling point, or a boiling point below about 180° C., may be selected. A solvent composition may also be selected based on its compatibility with one or more plant growth-promoting microbes, such as *Rhizobia*. Microbial compatibility may be measured by the extent of microbial death caused by exposure to a solvent composition and/or the extent of root growth caused by planting seeds treated with a PGR composition dissolved within a given solvent composition. In the latter case, more comprehensive root growth may be indicative of greater microbial compatibility. For example, *Rhizobia* can excrete nodulation factors that drive root nodule development, which may subsequently lead to extensive root hair growth. Microbial compatibility may also be determined by streaking one or more microbes of interest on a cell culture plate containing a growth medium, e.g., agar, infused with a solvent composition.

Methods of Use

Methods of improving plant growth can involve applying a plant growth composition comprising a PGR composition dissolved within one of the disclosed solvent compositions to plant seeds. The volume of the plant growth composition applied to the seeds can be sufficient to coat the seeds and eventually drive improved plant growth, development and/or yield. The solvent composition may be formed by combining 1-methoxy-2-propanol, glyceryl triacetate, methyl isobutyl ketone, 2-bytoxy ethanol, ethyl acetate, butyl lactate, lactic acid and/or n-butyl pyrrolidone with an active component combination comprising an amount of auxin, an amount of gibberellin, an amount of cytokinin, or a combination thereof.

The plant growth composition, comprising a solvent composition and an active component composition dissolved therein, may be sprayed or otherwise coated onto plant seeds prior to planting. The plant growth composition may be applied to seeds in production settings and then the seeds may be provided to a planting site, or the plant growth composition may be applied to the seeds at the planting site. Usage rates may vary depending on the particular compositions used and/or the plant type. For example, the active component loading rate may range from about 1.05 to about 4.2 fl. oz. per hundredweight (cwt.) for direct seed treatment. In some examples, the active component loading rate may be about 2.1 fl. oz./cwt. In additional embodiments, the active component loading rate may be decreased to about 1.5 fl. oz./cwt., about 1.0 fl. oz./cwt., about 0.75 fl. oz./cwt., about 0.5 fl. oz./cwt., or between about 0.1 and about 0.5 fl. oz./cwt. Embodiments including an active component loading rate below 2.1 fl. oz./cwt. may include a greater concentration of one or more active components. For example, the concentration of the active component combination may be about 4× for a growth composition loading rate of about 0.5 fl. oz./cwt. relative to the concentration of the active component combination included in a growth composition having a loading rate of about 2.1 fl. oz./cwt. By reducing the loading rate to about 0.5 fl. oz./cwt., the volume of plant growth composition expended per acre may be advantageously decreased without reducing its effectiveness at enhancing plant growth.

FIG. 1 is a flow diagram of a method of improving plant growth performed in accordance with principles of the present disclosure. The example method 100 shows the steps that may be implemented, in any sequence, to improve plant growth and/or development by applying a solvent composition mixed with an active component combination to plant seeds prior to planting. In additional examples, one or more of the steps shown in the method 100 may be supplemented or omitted.

In the embodiment shown, the method 100 begins at block 102 by "applying a growth composition to plant seeds, wherein the growth composition includes an active component combination of auxin, gibberellin and cytokinin, along with a solvent composition comprising 1-methoxy-2-propanol, glyceryl triacetate, methyl isobutyl ketone, 2-bytoxy ethanol, ethyl acetate, butyl lactate, lactic acid and/or n-butyl pyrrolidone." The method 100 continues at block 104 by "growing the plant seeds into mature plants." In some examples, the plant seeds can include soybean seeds, corn seeds, wheat seeds, barley seeds, alfalfa seeds, or combinations thereof. In some examples, mature plants may be defined as plants that reach the V3, V6, V9, VT, R1 or R6 growth stage, or any stage therebetween. Embodiments of the solvent composition may specifically exclude butanol, citric acid, lactic acid, propylene glycol, biodegradable polymers, polyhydric alcohols and/or water. In some examples, the boiling point of the solvent composition is at least about 100° C. and less than about 180° C. The solvent composition can be compatible with various plant growth-promoting microbes, such as *Rhizobia*. In another embodiment, the seeds may have the growth composition applied as a seed dressing or a seed coating and may be a seed product, and the seed product may be grown to maturity in step 104.

Applying the plant growth compositions to plant seeds according to the methods described herein may cause improvements in plant growth. For example, plant seeds treating with a disclosed plant growth composition may result in mature plants having increased plant height and/or leaf turgidity. Increases in total dry plant biomass relative to plants treated with a negative control may also be observed.

Solvent Characterization and Identification

Sequential experiments were performed to characterize the physical and chemical properties of various solvent compositions. Certain solvent compositions were then selected for continued analysis to identify the compositions most compatible with an assortment of PGR compositions, with an emphasis on PGR stability and solubility.

First, the physical properties of various known solvents and solvent combinations were documented by reviewing the Safety Data Sheet ("SDS") for each solvent. Information gleaned from each SDS included the flash point, boiling point, density, viscosity and solubility.

The solvents initially examined included ethyl acetate, 1-methoxy-2-propanol, ethylene glycol butyl ether and 2-butoxyl ethanol, diethylene glycol butyl ether, lactic acid and 2-ethylhexyl ester, tetrahydrofuryl alcohol, ethyl hexanol, butyl lactate, propylene glycol, polypropylene glycol, oxo-octyl acetate, glyceryl triacetate, oxo-heptyl acetate, amyl acetate, Hallcomid® M-8-10, and Hallcomid® 1025. Data for the 16 documented solvents, where available, are shown below in Table 1.

TABLE 1

| Comp. | Solvent | Flash Point (C. °) | Boiling Point (C. °) | Density (g/mL) | Viscosity (cP) | Solubility |
|---|---|---|---|---|---|---|
| 1 | Ethyl acetate | −4.4 | 77 | ND | ND | Miscible |
| 2 | 1-methoxy-2-propanol | 34 | 118 | 0.916 | +20 | Soluble |
| 3 | Ethylene glycol butyl ether, 2-butoxyl ethanol | 67 | 171 | 0.902 | −27 | Miscible |
| 4 | Diethylene glycol butyl ether | 99 | 228 | 0.953 | −14 | Miscible |
| 5 | Lactic acid, 2-ethylhexyl ester | ND* | 122 | 1.2 | −20 | Soluble |
| 6 | Tetrahydrofurfyl Alcohol | 75 | 178 | 1.054 | −14 | Miscible |
| 7 | Ethyl hexanol | 75 | 185 | 0.833 | +18 | Slightly |
| 8 | Butyl lactate | 69 | 186 | 0.984 | +15 | Slightly |
| 9 | Propylene Glycol | 138 | 205 | 1.12 | −10 | Soluble |
| 10 | Polypropylene Glycol | 94 | 287 | 1.01 | −19 | Miscible |
| 11 | Oxo-octyl acetate | 86 | 211 | 0.867 | −12 | ND |
| 12 | Glyceryl triacetate | 148 | 259 | 1.158 | ND | Soluble |
| 13 | Oxo-heptyl acetate | 43 | 192 | 0.886 | ND | Slightly Soluble |
| 14 | Amyl Acetate | 40 | 149 | 0.87 | 1.58 | Insoluble |
| 15 | Hallcomid ® M-8-10 | 118 | 250 | 0.879 | 11 | Miscible |
| 16 | Hallcomid ® 1025 | 134 | 297 | 7.40 | 0.886 | ND |

*ND = Not Determined

As shown, several known solvents have boiling points above 200° C., including propylene glycol, polypropylene glycol, diethylene glycol butyl ether, glyceryl triacetate, oxo-octyl acetate, Hallcomid® M-8-10, and Hallcomid® 1025. Select solvents have boiling points between about 110° C. and about 180° C., including 1-methoxy-2-propanol, ethylene glycol butyl ether, tetrahydrofuryl alcohol, and amyl acetate. The flash points of several solvents are above 115° C., including propylene glycol, glyceryl triacetate, Hallcomid® M-8-10, and Hallcomid® 1025. Multiple solvents are soluble, including 1-methoxy-2-propanol, lactic acid, 2-ethylhexyl ester, propylene glycol and glyceryl triacetate.

Various solvent compositions were then selected for continued analysis with various active components combinations formulated to enhance plant growth. In particular, each selected solvent composition was mixed with a PGR composition comprising cytokinin, gibberellin and auxin, and the solubility level of each PGR composition within each solvent composition determined.

Some of the PGR compositions were provided at an active component loading rate of 4× relative to a 1× loading rate of 2.1 fl. oz./cwt. For the 4×PGR compositions, the rate was adjusted to 0.5 fl. oz./cwt. to accommodate the flow meter properties of the seed treatment equipment that is typically used. Table 2 shows the active component loading at 2.1 fl. oz./cwt. and the adjusted rate of active components at 0.5 fl. oz./cwt., with each active component loading indicated by its weight percentage in the PGR composition (including the solvent).

TABLE 2

| Comp. | Loading Rate | Cytokinin | Auxin | Gibberellin |
|---|---|---|---|---|
| 1X | 2.1 fl. oz./cwt. | 0.0239% | 0.1262% | 0.0205% |
| 4X | 0.5 fl. oz./cwt. | 0.0955% | 0.5049% | 0.0819% |

The 14 unique solvent compositions evaluated together with a PGR composition are listed below in Table 3. As shown, some of the solvent compositions were mixed with deionized water ("DI"), while others were provided without dilution. For example, solvent composition 1 comprised 75% ethyl acetate and 25% DI water, mixed with a 4×PGR composition. Similarly, solvent composition 2 comprised 90% ethyl acetate and 10% DI water, mixed with a 4×PGR composition. Solvent composition 3 comprised 75% 1-methoxy-2-propanol and 25% DI water, mixed with a 1×PGR composition. The amount of each PGR component, measured in grams, is shown alongside the solubility level of each respective PGR composition.

The compositions were mixed in 120 mL glass jars with stir bars placed on magnetic stir plates. Solubility of each PGR composition was determined visually.

TABLE 3

| Comp. | Solvent Mixture | Cytokinin | Gibberellin | Auxin | Solubility |
|---|---|---|---|---|---|
| 1 | 75%/25% ethyl acetate + DI water (4x) | 0.0918 g. | 0.0811 g. | 0.4989 g. | Insoluble |
| 2 | 90/10: ethyl acetate + DI water (4x) | 0.0913 g. | 0.0796 g. | 0.4793 g. | Insoluble |
| 3 | 75/25: 1-methoxy-2-propanol + DI water | 0.0254 g. | 0.0288 g. | 0.112 g. | Soluble |
| 4 | 75%/25% ethylene glycol butyl ether + DI water | 0.0252 g. | 0.0197 g. | 0.1197 g. | Soluble |
| 5 | 50%/50% ethylene glycol butyl ether + DI water | 0.0246 g. | 0.0234 g. | 0.1117 g. | Soluble |
| 6 | 75%/25% diethylene glycol butyl ether + DI water | 0.0225 g. | 0.0253 g. | 0.1227 g. | Soluble |
| 7 | 50%/50% diethylene glycol butyl ether + DI water | 0.0302 g. | 0.0237 g. | 0.1129 g. | Soluble |
| 8 | 100% diethylene glycol butyl ether | 0.0254 g. | 0.0225 g. | 0.1099 g. | Soluble |
| 9 | 100% lactic acid | 0.0233 g. | 0.0202 g. | 0.1145 g. | Soluble |
| 10 | 100% tetrahydrofurfyl alcohol | 0.0242 g. | 0.0212 g. | 0.1119 g. | Soluble |
| 11 | 100% ethyl hexanol | 0.0275 g. | 0.0219 g. | 0.1160 g. | Insoluble |
| 12 | 100% butyl lactate | 0.0254 g. | 0.0232 g. | 0.1150 g. | Soluble |
| 13 | 100% Hallcomid® M-8-10 | 0.0251 g. | 0.0194 g. | 0.1177 g. | Slightly Soluble |
| 14 | 100% Hallcomid® 1025 | 0.0233 g. | 0.0208 g. | 0.1133 g. | Slightly Soluble |

Table 3 shows that the PGR compositions mixed with solvent compositions 1, 2 and 11 were insoluble, while the PGR compositions mixed with solvent compositions 3-10 and 12 were soluble. The PGR compositions mixed with solvent compositions 13 and 14, each comprised of Hallcomid® formulations, were slightly soluble.

Based on their favorable physical properties and solubility data, several solvent compositions were selected for additional analysis. Each selected solvent composition was mixed with 0.1 wt % butylated hydroxytoluene ("BHT") and a 4×PGR composition. Propylene glycol was used as a control. The evaluated solvents, along with the mass of each PGR component and BHT, are shown below in Table 4.

TABLE 4

| Solvent | Cytokinin (g) | Gibberellin (g) | Auxin (g) | BHT (g) |
|---|---|---|---|---|
| tetrahydrofurfyl alcohol | 0.0952 | 0.0802 | 0.4841 | 0.1068 |
| polyethylene glycol | 0.0989 | 0.0832 | 0.4740 | 0.1254 |
| 1-methoxy-2-propanol | 0.0927 | 0.0808 | 0.4874 | 0.1890 |
| diethylene glycol butyl ether | 0.0928 | 0.0841 | 0.4828 | 0.0990 |
| butyl lactate | 0.1065 | 0.0902 | 0.5347 | 0.1124 |
| polypropylene glycol | 0.0978 | 0.0876 | 0.4970 | 0.1189 |
| ethylene glycol butyl ether | 0.0920 | 0.1033 | 0.4809 | 0.1127 |

The density and viscosity of the solvent compositions were then determined. The density measurements were obtained using a DMA™ 4500, which was calibrated using 20° C. DI water. Viscosity was determined using a modular compact rheometer. Viscosity levels were measured at 25° C. Twenty data points were collected over a period of two minutes, and the average of these data points recorded as the viscosity.

As shown below in Table 5, 1-methoxy-2-propanol, diethylene glycol butyl ether, butyl lactate and ethylene glycol butyl ether each had a density measuring less than 1.00 g/mL. The viscosities of polyethylene glycol and polypropylene glycol were the greatest by a wide margin, and the viscosity of 1-methoxy-2-propanol was the lowest.

TABLE 5

| Solvent | Density (g/mL) | Viscosity (cPa) |
|---|---|---|
| tetrahydrofurfyl alcohol | 1.0548 | 5.4046 |
| polyethylene glycol | 1.1235 | 51.246 |
| 1-methoxy-2-propanol | 0.9215 | 2.3243 |
| diethylene glycol butyl ether | 0.9524 | 7.7338 |
| butyl lactate | 0.9823 | 5.0736 |
| polypropylene glycol | 1.0358 | 51.107 |
| ethylene glycol butyl ether | 0.8999 | 6.8808 |

The same seven solvent compositions were then evaluated for their compatibility with Warden® CX, which is a combination of fungicide and insecticide (containing a proprietary solvent) formulated for soybean seed treatment and sold by Winfield® United. Specifically, 0.5 fl. oz./cwt. of each experimental solvent was added to 50 mL of Warden® CX. Based on visual observations made upon mixing, none of the test solvents appeared incompatible with Warden® CX, indicating that such solvents may be advantageously mixed with Warden® CX and/or similar fungicide/insecticide compositions, along with a PGR composition dissolved therein. The mixtures were then evaluated for stability by placing the samples at 54° C., 4° C. and/or at −10° C. for a two-week period. Viscosity levels were measured before and after the two-week stability test, along with the post-test density levels, and the results shown below in Table 6.

TABLE 6

| Solvent | Pre: Viscosity (cPa) | Post: Viscosity (cPa) | Post: Density (g/mL) |
|---|---|---|---|
| tetrahydrofurfyl alcohol | 962.75 | 150.59 | 1.0825 |
| polyethylene glycol | 218.70 | 140.57 | 1.0825 |
| 1-methoxy-2-propanol | 1764.63 | 106.18 | 1.0440 |
| diethylene glycol butyl ether | 112.48 | 45.06 | 1.0486 |
| butyl lactate | 901.94 | 387.57 | 1.1067 |
| polypropylene glycol | 235.95 | 72.897 | 1.0671 |
| ethylene glycol butyl ether | 138.49 | 69.69 | 1.0263 |

Table 6 shows that the viscosity of each solvent mixture decreased significantly over the two-week period, with 1-methoxy-2-propanol decreasing the most. The post-experiment density of all samples ranged from about 1.02 to about 1.1.

To understand if changing the active component loading rate would impact the biological performance of the PGR compositions, two solvent compositions, methoxy propanol and tetrahydrofuryl alcohol, were mixed with various PGR compositions (4×) selected for their favorable solubility properties, curing properties, and compatibility with Rhizobia. Propylene glycol was again included as a control sample, and each composition was mixed with BHT (4×). Citric acid was excluded from all samples. The weight percentage of each PGR component mixed with each solvent composition is shown below in Table 7.

TABLE 7

| Solvent | Cytokinin (g) | Gibberellin (g) | Auxin (g) |
|---|---|---|---|
| methoxy propanol | 0.0614% | 0.0460% | 0.6596% |
| methoxy propanol | 0.1074% | 0.0460% | 0.6136% |
| methoxy propanol | 0.1534% | 0.0920% | 0.5215% |
| methoxy propanol | 0.1994% | 0.0690% | 0.4985% |
| methoxy propanol | 0.1074% | 0.0920% | 0.5675% |
| tetrahydrofurfyl alcohol | 0.094% | 0.0804% | 0.4958% |
| polypropylene glycol | 0.0955% | 0.0819% | 0.5049% |

Active ingredient loading of each PGR component was then measured via high performance liquid chromatography ("HPLC") to ensure the active components do not chemically decompose in the novel solvent compositions. The HPLC was performed using an Agilent 1260 device with a diode-array detector for active component quantification.

The percentage variation between the amount of each active component originally added to the solvent composition and the amount of each active component remaining after HPLC is indicated below in Table 8. As shown, the deviation was less than 1% for each composition.

TABLE 8

| | methoxy propanol | methoxy propanol | methoxy propanol | methoxy propanol | methoxy propanol | tetrahydrofurfyl alcohol | polypropylene glycol |
|---|---|---|---|---|---|---|---|
| Cyt. (g) | 0.072% | 0.126% | 0.178% | 0.235% | 0.130% | 0.108% | 0.116% |
| Gib. (g) | 0.046% | 0.045% | 0.088% | 0.069% | 0.089% | 0.081% | 0.080% |
| Aux. (g) | 0.674% | 0.630% | 0.531% | 0.502% | 0.579% | 0.497% | 0.523% |

The experimental results summarized above indicate that preexisting PGR compositions exhibit improved chemical stability and increased solubility in several of the solvent compositions disclosed herein.

As used herein, the term "about" modifying, for example, the quantity of a component in a composition, concentration, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or components used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

Similarly, it should be appreciated that in the foregoing description of example embodiments, various features are sometimes grouped together in a single embodiment for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

Although the present disclosure provides references to preferred embodiments, persons skilled in the art will recognize that changes may be made in form and detail without departing from the spirit and scope of the invention.

What is claimed is:

1. A plant growth composition comprising:
    a solvent composition, wherein the solvent composition is selected from the group consisting of: 1-methoxy-2-propanol and 2-butoxy ethanol; and
    an active component combination, the active component combination comprising an amount of auxin, an amount of gibberellin, and an amount of cytokinin, wherein the active component combination is formulated to increase growth of a plant.

2. The plant growth composition of claim 1, wherein the solvent composition comprises between about 95 wt % and about 99 wt % of the plant growth composition.

3. The plant growth composition of claim 1, wherein the solvent composition is compatible with a plant growth-promoting microbe.

4. The plant growth composition of claim 3, wherein the plant growth-promoting microbe comprises *Rhizobia*.

5. The plant growth composition of claim 1, wherein a boiling point of the solvent composition is at least about 100° C. and less than about 180° C.

6. The plant growth composition of claim 1, wherein the plant growth composition is configured for direct application to plant seeds.

7. A method of improving plant growth, the method comprising:
    applying a growth composition to plant seeds, the growth composition comprising:
        a solvent composition, wherein the solvent composition is selected from the group consisting of: 1-methoxy-2-propanol and 2-butoxy ethanol; and
        an active component combination, the active component combination comprising an amount of auxin, an amount of gibberellin, and an amount of cytokinin, wherein the active component combination is formulated to increase growth of a plant; and
    growing the plant seeds into mature plants.

8. The method of claim 7, wherein the plants comprise soybean plants, corn plants, wheat plants, barley plants, alfalfa plants, or combinations thereof.

9. The method of claim 7, wherein a boiling point of the solvent composition is at least about 100° C. and less than about 180° C.

10. The method of claim 7, wherein the solvent composition is compatible with *Rhizobia*.

* * * * *